US010297189B2

(12) United States Patent
Morimoto

(10) Patent No.: US 10,297,189 B2
(45) Date of Patent: May 21, 2019

(54) DISPLAY DRIVER ADAPTED TO IMAGE DATA PROCESSING AND OPERATING METHOD OF THE SAME

(71) Applicant: Synaptics Japan GK, Tokyo (JP)

(72) Inventor: Hiroshi Morimoto, Tokyo (JP)

(73) Assignee: Synaptics Japan GK, Nakano, Tokyo (JP)

( * ) Notice: Subject to any disclaimer, the term of this patent is extended or adjusted under 35 U.S.C. 154(b) by 230 days.

(21) Appl. No.: 15/297,555

(22) Filed: Oct. 19, 2016

(65) Prior Publication Data

US 2017/0116912 A1 Apr. 27, 2017

(30) Foreign Application Priority Data

Oct. 27, 2015 (JP) ................................ 2015-211076

(51) Int. Cl.
*G06K 9/00* (2006.01)
*G09G 3/20* (2006.01)

(52) U.S. Cl.
CPC ..... *G09G 3/2092* (2013.01); *G09G 2310/061* (2013.01); *G09G 2330/026* (2013.01)

(58) Field of Classification Search
CPC ........... G09G 3/2092; G09G 2310/061; G09G 2330/026; G09G 5/02; G06F 3/04847; G01C 21/367; G01C 21/3664; B60K 35/00; G06T 11/20
See application file for complete search history.

(56) References Cited

U.S. PATENT DOCUMENTS

2002/0008682 A1* 1/2002 Park .......................... G09G 3/20 345/87
2003/0160753 A1* 8/2003 McCartney .......... G09G 3/3611 345/99
2009/0027410 A1* 1/2009 Inuzuka ................. G09G 5/026 345/555
2009/0317082 A1* 12/2009 Kimura ................. H04J 3/1694 398/67
(Continued)

FOREIGN PATENT DOCUMENTS

JP 2003-143554 A 5/2003
JP 2006-190213 A 7/2006
JP 2008-078747 A 4/2008

OTHER PUBLICATIONS

Japan Application No. 2015-211076, Office Action dated Apr. 3, 2019, translated Apr. 9, 2019, consists of 6 pages.

*Primary Examiner* — Amir Alavi
(74) *Attorney, Agent, or Firm* — Patterson + Sheridan, LLP

(57) ABSTRACT

A display driver for driving a display panel includes a delay circuit configured to receive first image data and output the received first image data with a delay; an image data processing circuit configured to select a selected image data processing operation from among a plurality of predefined image data processing operations in response to image format information specifying the format of the first image data, and generate second image data by performing the selected image data processing operation on the first image data received from the delay circuit; and a drive circuitry driving the display panel in response to the second image data. The amount of the delay is controlled in response to the image format information.

20 Claims, 7 Drawing Sheets

(56) References Cited

U.S. PATENT DOCUMENTS

| | | | | |
|---|---|---|---|---|
| 2011/0292024 | A1* | 12/2011 | Baek | G09G 3/2096 345/212 |
| 2014/0111540 | A1* | 4/2014 | Morimoto | B60K 35/00 345/619 |
| 2014/0146098 | A1 | 5/2014 | Furihata et al. | |
| 2016/0092428 | A1* | 3/2016 | Ilic | G06F 3/04847 715/765 |
| 2017/0116912 | A1* | 4/2017 | Morimoto | G09G 3/2092 |
| 2017/0162236 | A1* | 6/2017 | Morimoto | G11C 7/1045 |
| 2017/0300218 | A1* | 10/2017 | Morimoto | B60K 35/00 |

* cited by examiner

DISPLAY DRIVER ADAPTED TO IMAGE DATA PROCESSING AND OPERATING METHOD OF THE SAME

CROSS REFERENCE

This application claims priority of Japanese Patent Application No. 2015-211076, filed on Oct. 27, 2015, the disclosure of which is incorporated herein by reference in its entirety.

TECHNICAL FIELD

The present disclosure relates to a display driver, display device and method of operating the display driver, more particularly, to a display driver incorporating an image data processing circuit which performs image data processing on image data.

BACKGROUND ART

A display driver driving a display panel (e.g. a liquid crystal display panel) often incorporates an image data processing circuit which performs desired data processing on image data. When image data transmitted from a host to a display driver include compressed image data generated through image compression, for example, a decompression processing to decompress the compressed image data is performed by an image data processing circuit in the display driver. A display driver incorporating a decompression circuit which decompresses compressed image data is disclosed, for example, in Japanese Patent Application Publication No. 2014-107754 A. An image data processing circuit may be incorporated in a display driver to perform image scaling (image enlargement and reduction) or to perform desired image processing (e.g. edge enhancement) for image quality improvement of the image displayed on the display panel.

In an actual use of a display driver incorporating an image data processing circuit, however, there may arise a case where it is necessary to appropriately configure the setting of a host that supplies image data to the display driver in accordance with the operation of the image data processing circuit. This may reduce the user-friendliness of the display driver. Such a problem may become apparent especially when the image data processing circuit incorporated in the display driver is adapted to perform a plurality of image data processing operations.

SUMMARY

Accordingly, an objective of embodiments of the present disclosure is to provide a technology for improving the user-friendliness of a display driver incorporating an image data processing circuit. Other objectives and new features of the embodiments would be understood by a person skilled in the art from the following disclosure.

In one embodiment, a display driver for driving a display panel includes: a delay circuit configured to receive first image data and output the received first image data with a delay; an image data processing circuit configured to select a selected image data processing from among a plurality of image data processings in response to image format information specifying a format of the first image data, and generate second image data by performing the selected image data processing on the first image data received from the delay circuit; and a drive circuitry driving the display panel in response to the second image data. The delay amount with which the first image data are delayed by the delay circuit is controlled in response to the image format information.

In another embodiment, a display driver includes: an image data processing circuit configured to receive first image data, select a selected image data processing from among a plurality of image data processing operations in response to image format information specifying a format of the first image data, and generate second image data by performing the selected image data processing on the first image data; a delay circuit configured to receive the second image data and output the second image data with a delay; and a drive circuitry driving the display panel in response to the second image data. The delay amount with which the second image data are delayed by the delay circuit is controlled in response to the image format information.

In still another embodiment, a display device includes a display panel and a display driver driving the display panel. The display driver includes: a delay circuit configured to receive first image data and output the received first image data with a delay; an image data processing circuit configured to select a selected image data processing from among a plurality of image data processing operations in response to image format information specifying a format of the first image data, and generate second image data by performing the selected image data processing on the first image data received from the delay circuit; and a drive circuitry driving the display panel in response to the second image data. The delay amount with which the first image data are delayed by the delay circuit is controlled in response to the image format information.

In still another embodiment, a display device includes a display panel and a display driver driving the display panel. The display driver includes: an image data processing circuit configured to receive first image data, select a selected image data processing from among a plurality of image data processing operations in response to image format information specifying a format of the first image data, and generate second image data by performing the selected image data processing on the first image data; a delay circuit configured to receive the second image data and output the second image data with a delay; and a drive circuitry driving the display panel in response to the second image data. The delay amount with which the second image data are delayed by the delay circuit is controlled in response to the image format information.

Embodiments of the present disclosure effectively improve the user-friendliness of a display driver incorporating an image data processing circuit.

BRIEF DESCRIPTION OF THE DRAWINGS

The above and other advantages and features of the present disclosure will be more apparent from the following description taken in conjunction with the accompanied drawings, in which.

DESCRIPTION OF PREFERRED EMBODIMENTS

The disclosure will be now described herein with reference to illustrative embodiments. Those skilled in the art would recognize that many alternative embodiments can be accomplished using the teachings of the present disclosure and that the disclosure is not limited to the embodiments illustrated for explanatory purposed.

For easy understanding of the disclosure included herein, a description is first given of a display driver incorporating an image data processing circuit and a problem caused on a display driver thus configured. It should be noted that the Applicant does not admit that the technology disclosed below is publicly known in the art.

Figure 1:
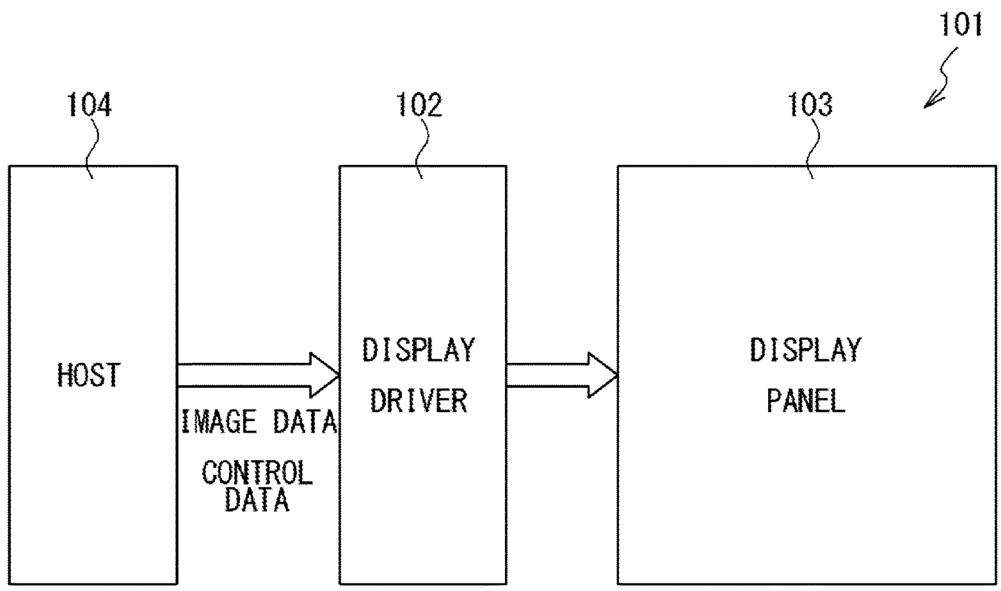
FIG. 1 is a block diagram illustrating one example of the configuration of a display device.

FIG. 1 is a block diagram illustrating one example of a display device, which is denoted by the numeral 101. The display device 101 illustrated in FIG. 1 includes a display driver 102 and a display panel 103. The display driver 102 drives the display panel 103 in response to image data and control data received from a host 104. As described above, a recent display driver often incorporates an image data processing circuit which performs data processing on the received image data; it is hereinafter assumed that the display driver 102 of the display device 101 illustrated in FIG. 1 incorporates an image data processing circuit. When the image data transmitted from the host 104 to the display driver 102 include compressed image data generated through image compression, for example, the image data processing circuit of the display driver 102 may include a decompression circuit configured to decompress the compressed image data. Alternatively, the image data processing circuit may be configured to perform various image processing operations (e.g. image scaling (image enlargement and reduction) and edge enhancement). It should be noted that data processing performed on image data may be simply referred to as "image data processing operation(s)", hereinafter.

It is often desired that an image data processing operation performed by the image data processing circuit of the display driver 102 is selected depending on the format of image data (hereinafter, simply referred to as "image format") which the user desires to use. In this case, the image data processing circuit is configured to selectively perform a plurality of image data processing operations.

The display driver 102 incorporating an image data processing circuit configured to selectively perform a plurality of image data processing operations may cause a problem of the user friendliness. The latency of the image data processing operation (that is, the time duration necessary for performing the image data processing) may vary depending on the selected image data processing operation. It is desired to appropriately configure the timing at which the host 104 starts transmitting image data, in accordance with the selected image data processing operation (that is, the image format of the image data supplied to the display driver 102), since the time duration of the blanking period of a display device is fixed in general. The display driver 102 thus configured may lack user-friendliness to a user of the display driver 102 (for example, a designer of a system including the display device 101 and the host 104).

Figure 2A:
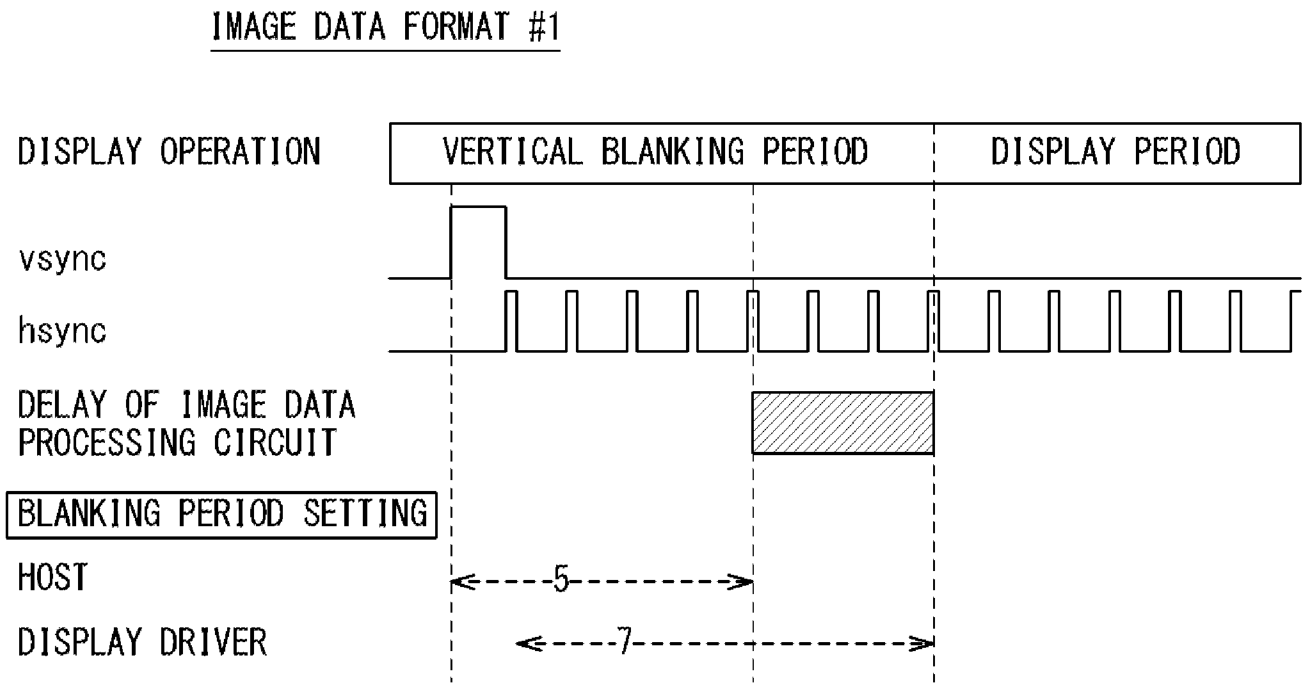
FIG. 2A is a timing chart illustrating an example of the settings of a host and the operation of a display driver incorporating an image data processing circuit configured to selectively perform a plurality of image data processes.
Figure 2B:
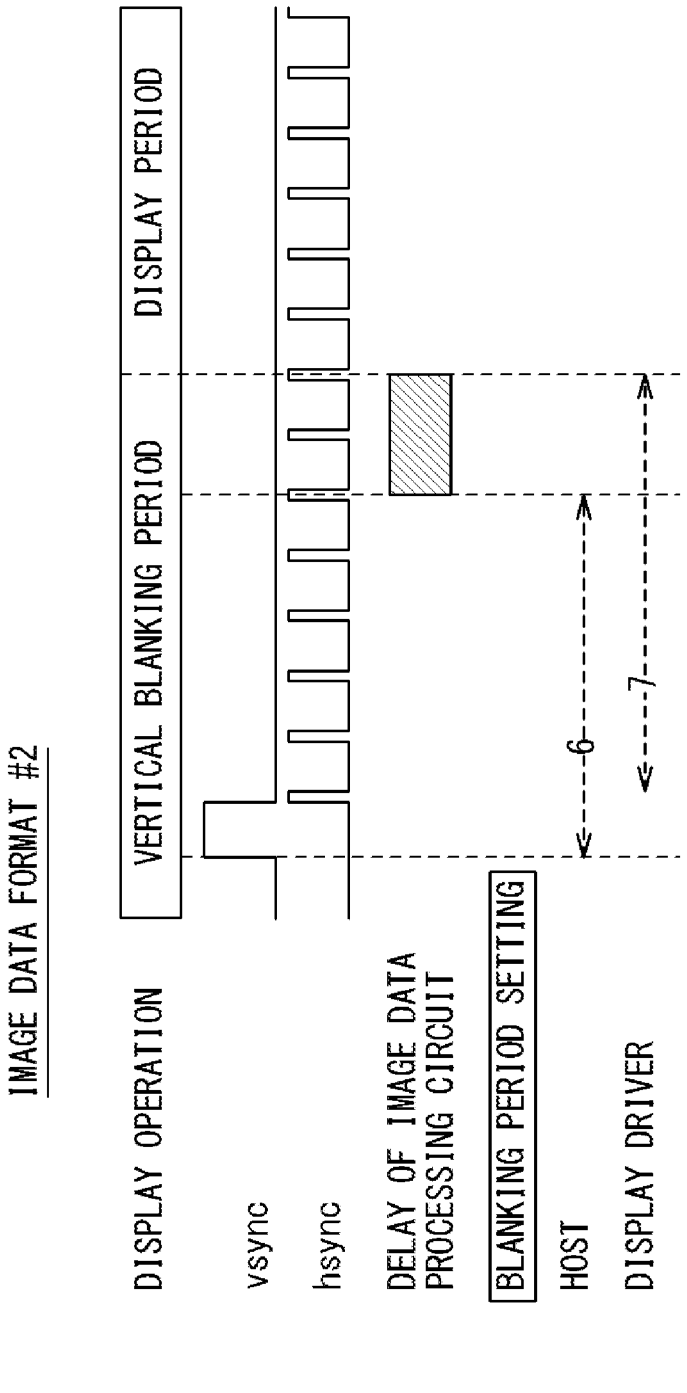
FIG. 2B is a timing chart illustrating another example of the settings of a host and the operation of a display driver incorporating an image data processing circuit configured to selectively perform a plurality of image data processes.

In the following, a description is given of the above-described problem in the user-friendliness with a specific example. FIGS. 2A and 2B are timing charts illustrating examples of the settings of the host 104 and the operations of the display driver 102 incorporating an image data processing circuit configured to selectively perform a plurality of image data processing operations. FIG. 2A illustrates the setting of the host 104 in the case where image data of "image format #1" are transmitted from the host 104 to the display driver 102, and FIG. 2B illustrates the setting of the host 104 in the case where image data of "image format #2" are transmitted from the host 104 to the display driver 102.

At the beginning of each vertical synchronization period, the host 104 indicates the start timing of the vertical synchronization period to the display driver 102. In a system in which a vertical synchronization signal vsync is supplied to the display driver 102 from the host 104, the start timing of each vertical synchronization period may be instructed by activating the vertical synchronization signal vsync (for example, by pulling up the vertical synchronization signal vsync to the high level in the case where the vertical synchronization signal vsync is high-active). In a system in which a vsync command, which indicates the start timing of each vertical synchronization period, is supplied to the display driver 102 from the host 104, the display driver 102 is configured to activate an internal vertical synchronization signal vsync generated therein. It should be noted that the timing at which the vertical synchronization signal vsync is activated or the timing at which a vsync command is supplied to the display driver 102 may be immediately after the start of each vertical synchronization period or after an expiration of a given time of period after the start of each vertical synchronization period. FIGS. 2A and 2B illustrate the operations in which the vertical synchronization signal vsync is activated after a given time of period expires after a vertical synchronization period is started.

After the activation of the vertical synchronization signal vsync, the display driver 102 activates the horizontal synchronization signal at the beginning of each horizontal synchronization period. In the operations illustrated in FIGS. 2A and 2B, the timing at which the horizontal synchronization signal is first activated after the activation of the vertical synchronization signal vsync is set to the timing at which a time period with a length of one horizontal synchronization period expires after the vertical synchronization signal vsync is activated.

Additionally, the display driver 102 starts a display period (a period in which the source lines of the display panel 103 are driven to display an image on the display panel 103) at the timing at which a given time of period expires after the start of the vertical synchronization period. The period from the beginning of the vertical synchronization period to the beginning of the display period is referred to as the vertical blanking period. In the operations illustrated in FIGS. 2A and 2B, the display period is started after seven horizontal synchronization periods expire after the horizontal synchronization signal is first activated.

It should be noted that the latency of the image data processing operation performed by the image data processing circuit may vary depending on the contents of the image data processing while the time duration of the vertical blanking period is fixed. For example, FIG. 2A illustrates the operation in the case where the latency of the image data processing circuit for the image data of image format #1 is three horizontal synchronization periods and FIG. 2B illustrates the operation in the case where the latency of the image data processing circuit for the image data of image format #2 is two horizontal synchronization periods.

One drawback of the operations illustrated in FIGS. 2A and 2B is that it is required to appropriately configure the operation timing of the host 104, more specifically, the timing at which the host 104 starts supplying the image data to the display driver 102, in accordance with the image format. When image data of image format #1 are supplied to the display driver 102 as illustrated in FIG. 2A, the host 104 is required to start supplying the image data at the timing when five horizontal synchronization periods expire after the activation of the vertical synchronization signal vsync, since the latency of the image data processing circuit is three horizontal synchronization periods. When image data of image format #2 are supplied to the display driver 102 as illustrated in FIG. 2B, on the other hand, the host 104 is required to start supplying the image data at the timing when six horizontal synchronization periods expire after the activation of the vertical synchronization signal vsync, since the latency of the image data processing circuit is two horizontal synchronization periods.

It is undesirable in view of the user-friendliness of the display driver 102 that the timing at which the host 104 starts supplying image data to the display driver 102 is required to be configured in accordance with the image format. Presented in the embodiments described below are display devices and display drivers configured to address this problem.

Figure 3:
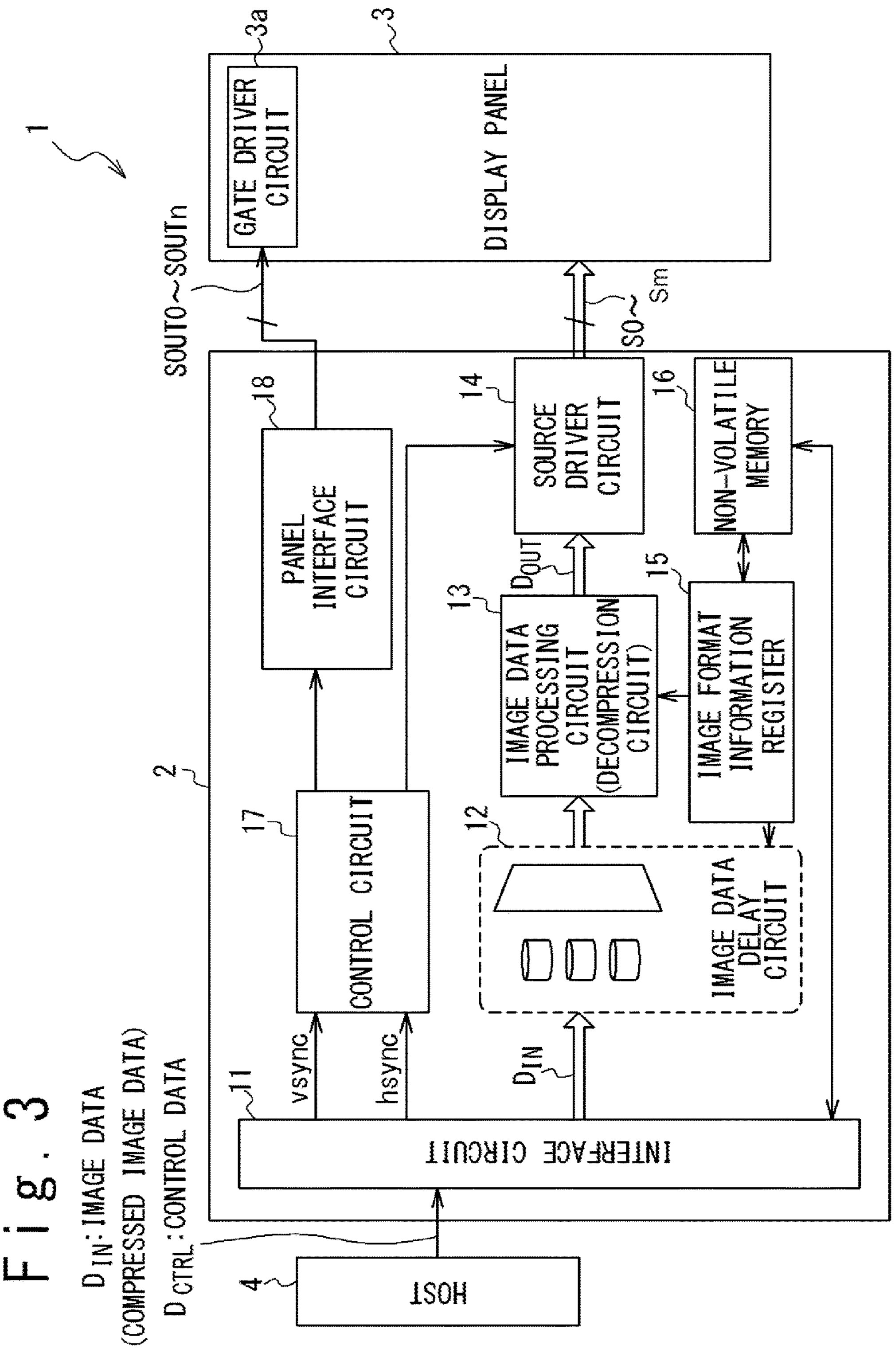
FIG. 3 is a block diagram illustrating an exemplary configuration of a display device in one embodiment.

FIG. 3 is a block diagram illustrating an exemplary configuration of a display device 1 in one embodiment of the present disclosure. The display device 1 of the present embodiment includes a display driver 2 and a display panel 3. In one embodiment, a liquid crystal display panel may be used as the display panel 3. The display panel 3 include a plurality of gate lines, a plurality of source lines, a plurality of pixels arrayed in rows and columns and a gate driver circuit 3*a* driving the source lines. In the present embodiment, the gate driver circuit 3*a* is integrated on the glass substrate of the display panel 3; this type of gate driver circuit is often referred to as a GIP (gate-in-panel) circuit. The display driver 2 is configured to drive the display panel 3 in response to image data $D_{IN}$ and control data $D_{CTRL}$ which are received from the host 4. In the present embodiment, compressed image data generated through image compression are supplied to the display panel 3 as the image data $D_{IN}$. The host 4 generates the compressed image data by performing given image compression processing.

The display driver 2 includes an interface circuit 11, an image data delay circuit 12, an image data processing circuit 13, a source driver circuit 14, an image format information register 15, a non-volatile memory 16, a control circuit 17 and a panel interface circuit 18.

The interface circuit 11 is used to receive data and signals suppled from the host 4 to the display driver 2 and to transmit desired data and/or signals to the host 4. The interface circuit 11 transfers to the image data delay circuit 12 the image data $D_{IN}$ (compressed image data) received from the host 4 and generates a vertical synchronization signal vsync and a horizontal synchronization signal hsync in response to the control data $D_{CTRL}$. In one embodiment, the control data $D_{CTRL}$ may include a command indicating the start timing of a vertical synchronization period (vsync command) and a command indicating the start timing of a horizontal synchronization period (hsync command); in this case, the vertical synchronization signal vsync and the horizontal synchronization signal hsync may be generated in response to these commands.

Although the display driver 2 is configured to generate the vertical synchronization signal vsync and the horizontal synchronization signal hsync in response to the control data $D_{CTRL}$ (which include a vsync command and an hsync command) in the present embodiment, the host 4 may instead supply the vertical synchronization signal vsync and the horizontal synchronization signal hsync to the display driver 2 in an alternative embodiment. In this case, the host 4 indicates the start timing of each vertical synchronization period by activating the vertical synchronization signal vsync (e.g. by pulling up the vertical synchronization signal vsync to the high level) and indicates the start timing of each horizontal synchronization period by activating the horizontal synchronization signal hsync.

The image data delay circuit 12 outputs the image data $D_{IN}$ received from the interface circuit 11 with a delay. The delay amount of the image data $D_{IN}$ in the image data delay circuit 12 is controlled depending on image format information stored in the image format information register 15. In the present embodiment, as described later in detail, image format information indicating the image format of the image data $D_{IN}$ supplied from the host 4 is stored in advance in the image format information register 15 and the delay amount of the image data $D_{IN}$ in the image data delay circuit 12 is automatically controlled in response to the image format information. This operation effectively makes it easy to configure the settings of the host 4, and contributes improvement of the user-friendliness of the display driver 2.

The image data processing circuit 13 generates output image data $D_{OUT}$ by performing image data processing on the image data $D_{IN}$ received from the image data delay circuit 12. In the present embodiment, in which the image data $D_{IN}$ supplied to the image data processing circuit 13 include compressed image data, the image data processing circuit 13 generates the output image data $D_{OUT}$ by performing decompression processing on the image data $D_{IN}$.

In the present embodiment, the image data processing circuit 13 is adapted to compressed image data of different image formats and configured to perform decompression processing in accordance with the image format of the received image data $D_{IN}$. More specifically, the image data processing circuit 13 is adapted to a plurality of decompressing processing operations and configured to select a decompressing processing to be performed in response to the image format information stored in the image format information register 15 and generate the output image data $D_{OUT}$ by performing the selected decompressing processing on the image data $D_{IN}$ received from the image data delay circuit 12.

The source driver circuit 14 operates as a drive circuitry which generate source drive signals S0 to Sm (m is a given natural number) to be fed to the respective source lines of the display panel 3, in response to the output image data $D_{OUT}$ received from the image data processing circuit 13. The source drive signals S0 to Sm are supplied to the respective source lines of the display panel 3 to drive the source lines.

The image format information register 15 and the non-volatile memory 16 operate as a storage circuitry which stores therein the image format information and supplies the stored image format information to the image data delay circuit 12 and the image data processing circuit 13. In the present embodiment, the image format information register 15 is configured to have a reduced access time although storing the image format information only volatilely; the image format information register 15 is used to supply the stored image format information to the image data delay circuit 12 and the image data processing circuit 13. The non-volatile memory 16, on the other hand, stores the image format information in a non-volatile manner. When the display driver 2 is booted (e.g., a boot sequence is started upon a power-on of the display driver 2), the image format information stored in the non-volatile memory 16 is transferred to the image format information register 15.

In a preferred embodiment, the display driver 2 is configured so that the image format information stored in the non-volatile memory 16 is externally rewritable, for example, from the host 4. When the non-volatile memory 16 is rewritten from the host 4, image format information to be written into the non-volatile memory 16 and a write command which instructs to write the image format information are transmitted to the interface circuit 11. The interface circuit 11 writes the image format information into the non-volatile memory 16 in response to the write command.

The configuration in which the image format information stored in the non-volatile memory 16 is externally writable advantageously allows satisfying various requests of users with the same display drivers 2. The image formats the users desire to use may be different depending on the users. It may be unpreferable in terms of the cost that the image data processing circuit 13 is differently designed in accordance with the requests of the individual users. In the present embodiment, the image data processing circuit 13 is designed so that the image data processing circuit 13 is adapted to a plurality of image data processing operations and performs the image data processing selected in response to the image format information stored in the non-volatile memory 16. This allows easily satisfying various needs of users by storing the image format information in the non-volatile memory 16 in accordance with the image format desired by each user.

The control circuit 17 performs controls of various circuits of the display driver 2, including a control of the operation timing in response to the vertical synchronization signal vsync and the horizontal synchronization signal hsync.

The panel interface circuit 18 generates, under the control of the control circuit 17, gate control signals SOUT0-SOUTn (n is a given integer) to control the gate driver circuit 3*a*, which is integrated in the display panel 3.

Figure 4A:
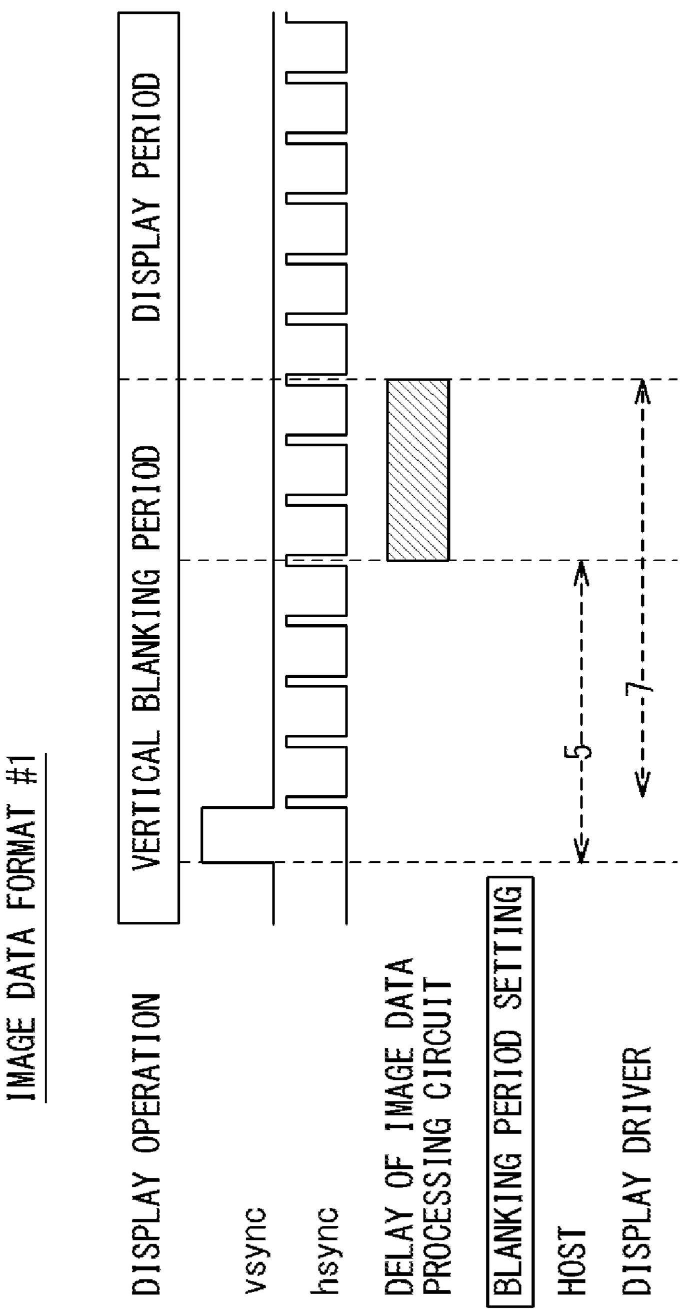
FIG. 4A is a timing chart illustrating an example of the operation of a display driver and the settings of a host in the present embodiment.
Figure 4B:
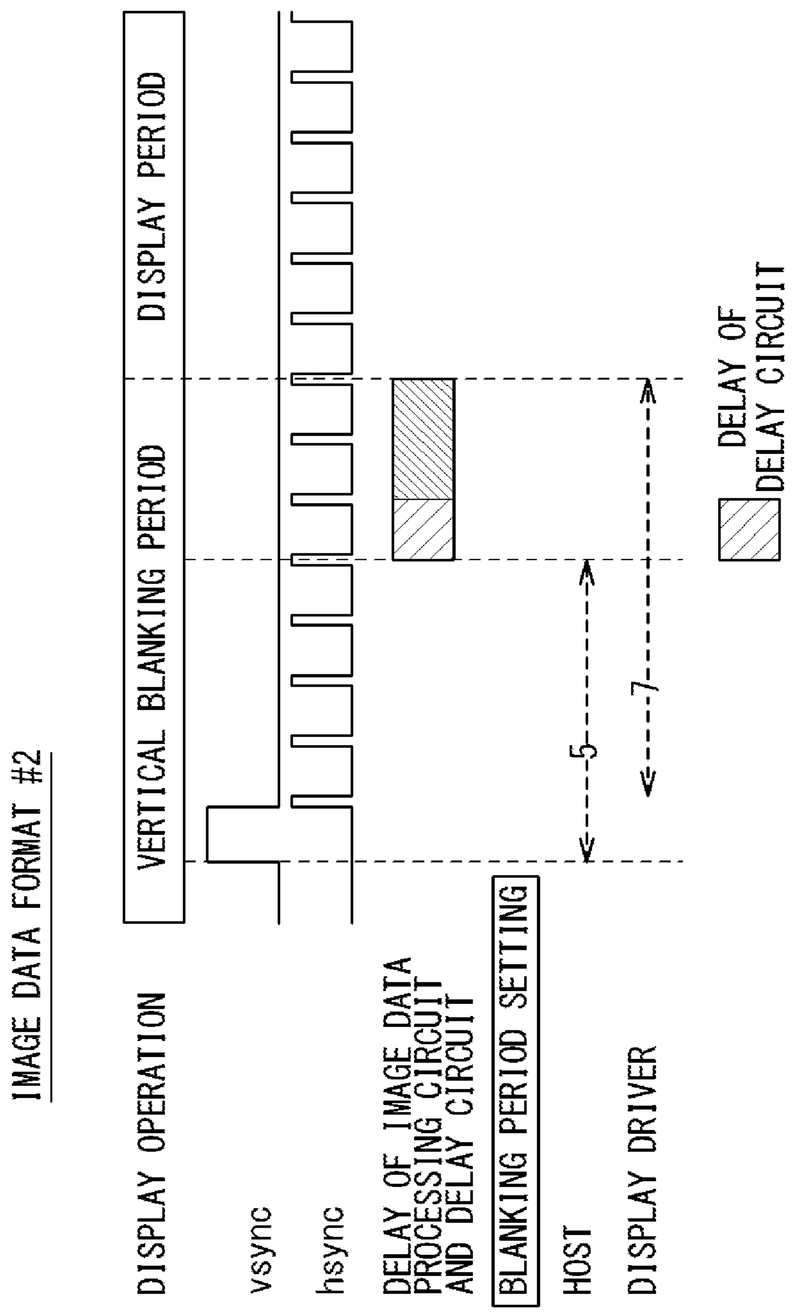
FIG. 4B is a timing chart illustrating another example of the operation of a display driver and the settings of a host in the present embodiment.

Next, a description is given on an exemplary operation of the display device 1 in the present embodiment. FIGS. 4A and 4B are timing charts illustrating examples of the operations of the display driver 2 in the present embodiment. FIG. 4A illustrates an exemplary operation of the display driver 2 in the case where image data of "image format #1" are transmitted from the host 4 to the display driver 2, and FIG. 4B illustrates an exemplary operation of the display driver 2 in the case where image data of "image format #2" are transmitted from the host 4 to the display driver 2.

In the present embodiment, image format information of image data to be transmitted from the host 4 to the display driver 2 is preliminarily set in the image format information register 15 of the display driver 2. In one embodiment, the image format information indicating the image format the user desires to use may be stored in the non-volatile memory 16 and the image format information may be transferred from the non-volatile memory 16 to the image format information register 15 in booting the display driver 2 (e.g., in the boot sequence performed upon the power-on of the display driver 2).

At the beginning of each vertical synchronization period, the host 4 instructs the start timing of each vertical synchronization period to the display driver 2. In the present embodiment, the host 4 supplies to the display driver 2 a vsync command indicating the start timing of the vertical synchronization period. The interface circuit 11 of the display driver 2 activates the vertical synchronization signal vsync in response to the vsync command. The timing at which the host 4 supplies the vsync command and the timing at which the vertical synchronization signal vsync is activated may be immediately after the start of the vertical synchronization period or the timing at which a given time of period elapses after the start of the vertical synchronization period. FIGS. 4A and 4B illustrates the operations in which the vertical synchronization signal vsync is activated when a given time of period elapses after the start of the vertical synchronization period.

The host 4 further supplies to the display driver 2 an hsync command indicating the start timing of each horizontal synchronization period. The interface circuit 11 of the display driver 2 activates the horizontal synchronization signal hsync at the beginning of each horizontal synchronization period in response to the hsync command. In the operations illustrated in FIGS. 4A and 4B, the horizontal synchronization signal hsync is first activated when a time of period of a length of one horizontal synchronization period elapses after the activation of the vertical synchronization signal vsync.

Although the operation in which the host 4 supplies the vsync and hsync commands to the display driver 2 is disclosed in the present embodiment, the host 4 may instead supply the vertical synchronization signal vsync and the horizontal synchronization signal hsync to the display driver 2. In this case, the host 4 indicates, to the display driver 2, the start timings of each vertical synchronization period and each horizontal synchronization period with the vertical synchronization signal vsync and the horizontal synchronization signal hsync, respectively.

The display driver 2 starts the display period (that is, the period in which the source lines of the display panel 3 are drive to display an image on the display panel 3) when a given time of period elapses after the vertical synchronization period is started. The period between the start of the vertical synchronization period and the start of the display period is referred to as the vertical blanking period. In the operation illustrated in FIGS. 4A and 4B, the display driver 2 starts the display period when a given number of horizontal synchronization periods, in the present embodiment, seven horizontal synchronization periods elapse after the horizontal synchronization signal is first activated. In the display period, the source lines of the display panel 3 are driven by the source driver circuit 14.

The host 4 starts supplying image data $D_{IN}$ when a given time of period elapses after each vertical synchronization period is started. As described above, the image data $D_{IN}$ include compressed image data generated through image compression in the present embodiment. The image data $D_{IN}$ transferred from the host 4 to the display driver 2 are supplied to the image data processing circuit 13 via the interface circuit 11 and the image data delay circuit 12. The image data processing circuit 13 selects the decompression processing adapted to the image format of the display data $D_{IN}$ in response to the image format information stored in the image format information register 15 and generates output image data $D_{OUT}$ by performing the selected decompression processing on the image data $D_{IN}$.

It should be noted that the latency of the decompression processing performed by the image data processing circuit 13 may vary depending on the image format of the image data $D_{IN}$. In the present embodiment, as illustrated in FIG. 4A, for example, the latency of the decompression processing performed by the image data processing circuit 13 is three horizontal synchronization periods when the image format of the image data $D_{IN}$ supplied to the display driver 2 is "image format #1". As illustrated in FIG. 4B, on the other hand, the latency of the decompression processing performed by the image data processing circuit 13 is two horizontal synchronization periods when the image format of the image data $D_{IN}$ supplied to the display driver 2 is "image format #2".

In the present embodiment, the image data delay circuit 12 is used to absorb the variations in the latency of the decompression processing. The delay amount of the image data delay circuit 12 is controlled in response to the image format information stored in the image format information register 15. This allows fixedly configuring the timing at which the host 4 starts supplying the image data $D_{IN}$ to the display driver 2, regardless of the image format of the image data $D_{IN}$.

In the present embodiment, the delay amount of the image data delay circuit 12 is controlled so that the sum of the delay amount of the image data delay circuit 12 and the latency of the decompression processing performed by the image data processing circuit 13 is kept constant. For example, as illustrated in FIG. 4A, the image data delay circuit 12 outputs the image data $D_{IN}$ without a delay, when the image format of the image data $D_{IN}$ supplied to the display driver 2 is "image format #1". In other words, the delay amount of the image data delay circuit 12 is set to zero. When the image format of the image data $D_{IN}$ supplied to the display driver 2 is "image format #2", on the other hand, the delay amount of the image data delay circuit 12 is set to one horizontal synchronization period. It should be noted that, in both cases, the sum of the delay amount of the image data delay circuit 12 and the latency of the decompression processing performed by the image data processing circuit 13 is constantly kept to three horizontal synchronization periods.

The operation described above allows keeping the timing at which the host 4 starts supplying the image data $D_{IN}$ to the display driver 2 unchanged, regardless of the image format of the image data $D_{IN}$. For both of the operations illustrated in FIGS. 4A and 4B, in which the latencies of the decompression processing operations performed by the image data processing circuit 13 are different, for example, the host 4 is to be commonly configured so that the host 4 starts supplying the image data $D_{IN}$ to the display driver 2 when five horizontal synchronization periods elapse after the activation of the vertical synchronization signal vsync. This effectively facilitates the operation setting of the host 4.

As described above, the delay amount of the image data delay circuit 12 is controlled in response to the image format information indicating the image format of the image data $D_{IN}$ in the present embodiment. Accordingly, the timing at which the host 4 should start supplying the image data $D_{IN}$ to the display driver 2 is fixed regardless of the image format of the image data $D_{IN}$. This effectively improves the user-friendliness of the display driver 2.

Although the configuration in which the decompression processing is performed on the image data $D_{IN}$ including compressed image data is disclosed in the above-described embodiment, different image data processing operations may be performed by the image data processing circuit 13. For example, the image data processing circuit 13 may be adapted to a plurality of image data processing operations (e.g., image scaling (image enlargement and reduction) and edge enhancement), and configured to select an image data processing to be performed, in response to the image format information indicating the image format of the image data $D_{IN}$. Also in this case, the delay amount of the image data delay circuit 12 is controlled in response to the image format information stored in the image format information register 15. It is possible to fix the timing at which the host 4 should start supplying the image data $D_{IN}$ to the display driver 2 regardless of the image format of the image data $D_{IN}$, by appropriately setting the delay amount of the image data delay circuit 12 in response to the image format information (more specifically, by controlling the delay amount of the image data delay circuit 12 so that the sum of the delay amount of the image data delay circuit 12 and the latency of the image data processing operation performed by the image data processing circuit 13 is kept constant).

Figure 5:
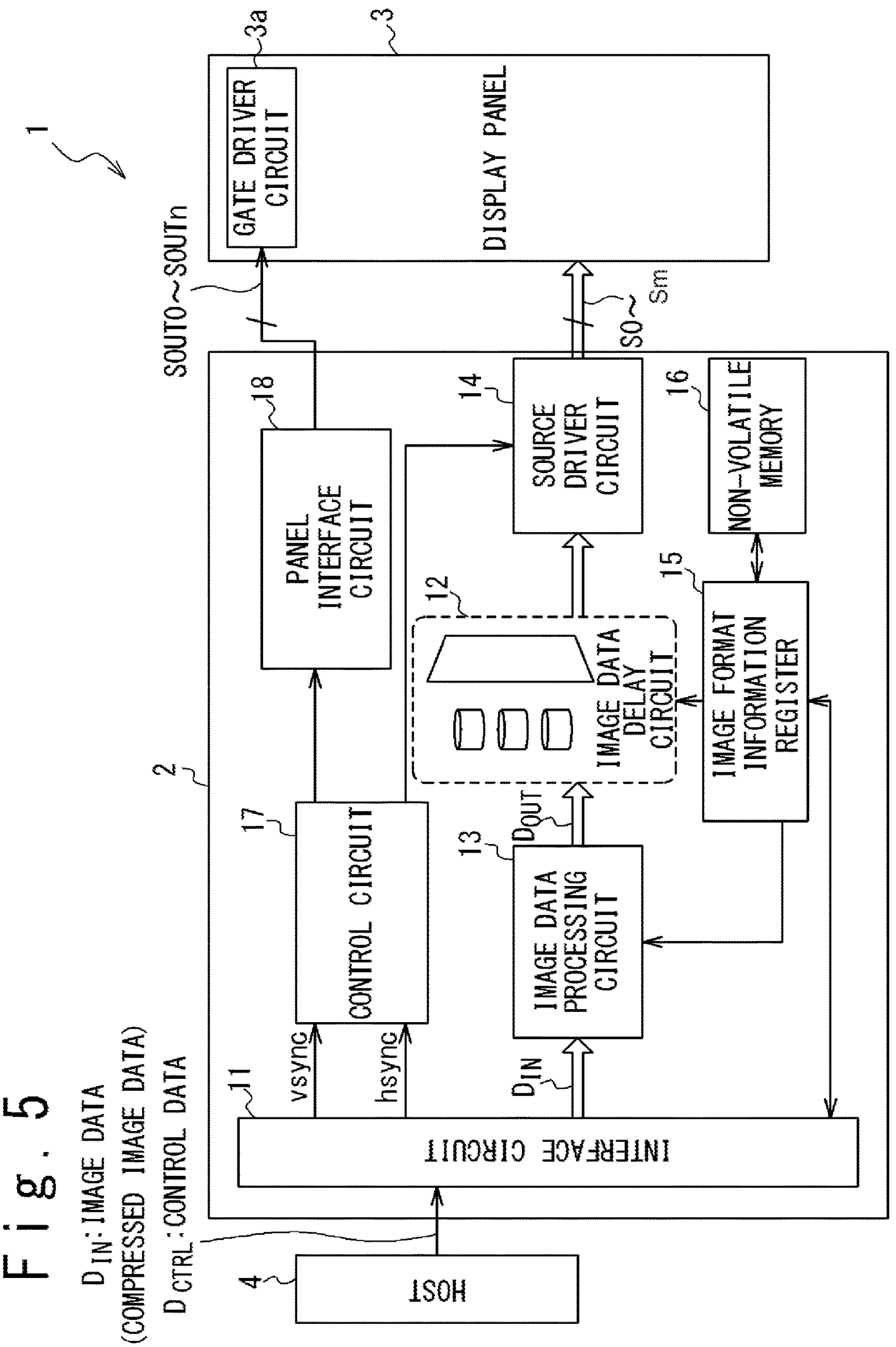
FIG. 5 is a block diagram illustrating an exemplary configuration of a display device in another embodiment.

It should be noted that, although the configuration in which the image data processing circuit 13 performs image data processing on the image data $D_{IN}$ received from the image data delay circuit 12 is disclosed in the above-described embodiment, the locations of the image data delay circuit 12 and the image data processing circuit 13 may be exchanged. FIG. 5 illustrates the display driver 2 such configured.

In the configuration illustrated in FIG. 5, the image data processing circuit 13 generates output image data $D_{OUT}$ by performing image data processing on the image data $D_{IN}$ received from the interface circuit 11. The image data delay circuit 12 outputs the output image data $D_{OUT}$ received from the image data processing circuit 13 with a delay. The source driver circuit 14 drives the respective source lines of the display panel 3 in response to the output image data $D_{OUT}$ received from the image data delay circuit 12.

It would be easily understood to a person skilled in the art that the configuration illustrated in FIG. 5 also allows improving the user-friendliness of the display driver 2 by controlling the delay amount of the image data delay circuit 12 in response to the image format information indicating the image format of the image data $D_{IN}$.

Although various embodiments of the present disclosure are specifically described in the above disclosure, the present disclosure must not be construed as being limited to the embodiments described above. It would be apparent to a person skilled in the art that the present disclosure may be implemented with various modifications.

What is claimed is:

1. A display driver for driving a display panel, the display driver comprising:

a delay circuit configured to receive first image data and output the received first image data with a delay, wherein an amount of the delay is controlled in response to image format information specifying a format of the first image data;

an image data processing circuit configured to:

select a selected image data processing operation from among a plurality of predefined image data processing operations in response to the image format information; and generate second image data by performing the selected image data processing operation on the first image data received from the delay circuit; and a drive circuitry configured to drive the display panel in response to the second image data.

2. The display driver according to claim 1, wherein a sum of a latency of the selected image data processing operation and the amount of the delay of the delay circuit is constant regardless of which of the plurality of predefined image data processing operations is selected.

3. The display driver according to claim 1, further comprising:

a storage circuitry storing the image format information, wherein the image data processing circuit selects the selected image data processing operation in response to the image format information stored in the storage circuitry, and wherein the amount of the delay is controlled in response to the image format information stored in the storage circuitry.

4. The display driver according to claim 3, wherein the storage circuitry includes a non-volatile memory storing the image format information in a non-volatile manner, and wherein the non-volatile memory is configured so that the image format information stored in the non-volatile memory is rewritable from an external entity provided outside the display driver.

5. The display driver according to claim 4, wherein the storage circuitry further includes a register volatilely storing the image format information, wherein the image format information is transferred from the non-volatile memory to the register in booting the display driver, and wherein the image data processing circuit selects the selected image data processing operation in response to the image format information stored in the register.

6. A display driver for driving a display panel, the display drive comprising:

an image data processing circuit configured to:

receive first image data;

select a selected image data processing operation from among a plurality of predefined image data processing operations in response to image format information specifying a format of the first image data; and generate second image data by performing the selected image data processing operation on the first image data;

a delay circuit configured to receive the second image data and output the second image data with a delay, wherein an amount of the delay is controlled in response to the image format information; and a drive circuitry configured to drive the display panel in response to the second image data.

7. The display driver according to claim 6, wherein a sum of a latency of the selected image data processing operation and the amount of the delay of the delay circuit is constant regardless of which of the plurality of predefined image data processing operations is selected.

8. The display driver according to claim 6, further comprising:

a storage circuitry storing the image format information, wherein the image data processing circuit selects the selected image data processing operation in response to the image format information stored in the storage circuitry, and wherein the amount of the delay is controlled in response to the image format information stored in the storage circuitry.

9. The display driver according to claim 8, wherein the storage circuitry includes a non-volatile memory storing the image format information in a non-volatile manner, and wherein the non-volatile memory is configured so that the image format information stored in the non-volatile memory is rewritable from an external entity provided outside the display driver.

10. The display driver according to claim 9, wherein the storage circuitry further includes a register volatilely storing the image format information, wherein the image format information is transferred from the non-volatile memory to the register in booting the display driver, and wherein the image data processing circuit selects the selected image data processing operation in response to the image format information stored in the register.

11. A display device, comprising:

a display panel; and a display driver for driving the display panel, wherein the display driver includes:

a delay circuit configured to receive first image data and output the received first image data with a delay, wherein an amount of the delay is controlled in response to image format information specifying a format of the first image data;

an image data processing circuit configured to:

select a selected image data processing operation from among a plurality of predefined image data processing operations in response to the image format information; and generate second image data by performing the selected image data processing operation on the first image data received from the delay circuit; and a drive circuitry configured to drive the display panel in response to the second image data.

12. The display device according to claim 11, wherein a sum of a latency of the selected image data processing operation and the amount of the delay of the delay circuit is constant regardless of which of the plurality of predefined image data processing operations is selected.

13. The display device according to claim 11, the display driver further comprising:

a storage circuitry storing the image format information, wherein the image data processing circuit selects the selected image data processing operation in response to the image format information stored in the storage circuitry, and wherein the amount of the delay is controlled in response to the image format information stored in the storage circuitry.

14. The display device according to claim 13, wherein the storage circuitry includes a non-volatile memory storing the image format information in a non-volatile manner, and wherein the non-volatile memory is configured so that the image format information stored in the non-volatile memory is rewritable from an external entity provided outside the display driver.

15. The display device according to claim 14, wherein the storage circuitry further includes a register volatilely storing the image format information, wherein the image format information is transferred from the non-volatile memory to the register in booting the display driver, and wherein the image data processing circuit selects the selected image data processing operation in response to the image format information stored in the register.

16. A display device, comprising:

a display panel; and a display driver for driving the display panel, wherein the display driver includes:

an image data processing circuit configured to:

receive first image data;

select a selected image data processing operation from among a plurality of predefined image data processing operations in response to image format information specifying a format of the first image data; and generate second image data by performing the selected image data processing operation on the first image data;

a delay circuit configured to receive the second image data and output the second image data with a delay, wherein an amount of the delay is controlled in response to the image format information; and a drive circuitry configured to drive the display panel in response to the second image data.

17. The display device according to claim 16, wherein a sum of a latency of the selected image data processing operation and the amount of the delay of the delay circuit is constant regardless of which of the plurality of predefined image data processing operations is selected.

18. The display device according to claim 16, the display driver further comprising:

a storage circuitry storing the image format information, wherein the image data processing circuit selects the selected image data processing operation in response to the image format information stored in the storage circuitry, and wherein the amount of the delay is controlled in response to the image format information stored in the storage circuitry.

19. The display device according to claim 18, wherein the storage circuitry includes a non-volatile memory storing the image format information in a non-volatile manner, and wherein the non-volatile memory is configured so that the image format information stored in the non-volatile memory is rewritable from an external entity provided outside the display driver.

20. The display device according to claim 19, wherein the storage circuitry further includes a register volatilely storing the image format information, wherein the image format information is transferred from the non-volatile memory to the register in booting the display driver, and wherein the image data processing circuit selects the selected image data processing operation in response to the image format information stored in the register.

* * * * *